(12) United States Patent
Marquet (10) Patent No.: US 7,408,272 B2
(45) Date of Patent: Aug. 5, 2008

(54) METHOD AND DEVICE FOR SUPPLYING ELECTRIC ENERGY POWER TO AN APPLIANCE

(75) Inventor: Didier Marquet, Malakoff (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 10/494,918

(22) PCT Filed: Nov. 8, 2002

(86) PCT No.: PCT/FR02/03841

§ 371 (c)(1),
(2), (4) Date: Nov. 1, 2004

(87) PCT Pub. No.: WO03/041189

PCT Pub. Date: May 15, 2003

(65) Prior Publication Data

US 2005/0057225 A1    Mar. 17, 2005

(30) Foreign Application Priority Data

Nov. 9, 2001    (FR) .................................. 01 14538

(51) Int. Cl.
*H02J 7/02* (2006.01)
*H02J 9/06* (2006.01)
(52) U.S. Cl. ............................ 307/48; 307/87; 320/103
(58) Field of Classification Search .................. 320/138, 320/160, 103, 104, 112; 307/46, 75, 26, 307/28, 48, 87, 130; 439/956
See application file for complete search history.

(56) References Cited

U.S. PATENT DOCUMENTS

| | | | |
|---|---|---|---|
| 3,838,327 A * | 9/1974 | Uemichi et al. ............. 320/138 |
| 4,611,161 A | 9/1986 | Barker | |
| 4,912,392 A * | 3/1990 | Faulkner ..................... 320/132 |
| 4,959,604 A | 9/1990 | Cuesta | |
| 5,200,685 A * | 4/1993 | Sakamoto ................... 320/103 |
| 5,200,688 A * | 4/1993 | Patino et al. ................ 320/138 |
| 5,387,820 A | 2/1995 | Imagawa | |
| 5,459,389 A * | 10/1995 | Fujiwara et al. ............. 320/111 |
| 5,686,809 A * | 11/1997 | Kimura et al. .............. 320/138 |
| 5,883,494 A * | 3/1999 | Kobayashi et al. .......... 320/115 |
| 6,043,626 A * | 3/2000 | Snyder et al. ............... 320/113 |
| 6,184,654 B1 * | 2/2001 | Bachner et al. ............. 320/114 |
| 6,414,403 B2 | 7/2002 | Kitagawa et al. | |

FOREIGN PATENT DOCUMENTS

DE    20107797    9/2001

(Continued)

Primary Examiner—Michael Sherry
Assistant Examiner—Andrew Deschere
(74) Attorney, Agent, or Firm—Cohen Pontani Lieberman & Pavane LLP (57) ABSTRACT

The invention concerns a portable device for electric power supply comprising: connection means (8) for connecting an appliance (1) to be powered; and a power supply circuit (6; 16) supplying in output a supply voltage for the appliance when the circuit is selectively connected to a mains supply or to a low-voltage electric power source. It may also comprise a battery (10). In that case, the circuit (6, 16) can charge the power storage means when the circuit is connected to an appropriate electric power source, the connection means ensuring power supply to the appliance (1) from the power storage means (10).

16 Claims, 3 Drawing Sheets

FOREIGN PATENT DOCUMENTS

| | | |
|---|---|---|
| EP | 0907234 | 4/1999 |
| GB | 2349518 | 11/2000 |
| JP | 5-49179 | 2/1993 |
| JP | 11-69659 | 3/1999 |
| JP | 11-196541 | 7/1999 |
| JP | 2000-134146 | 5/2000 |
| JP | 2001-28836 | 1/2001 |
| JP | 2001-309563 | 11/2001 |
| WO | PCT/FR02/03841 | 11/2002 |

\* cited by examiner

FIG_5

METHOD AND DEVICE FOR SUPPLYING ELECTRIC ENERGY POWER TO AN APPLIANCE

This is a U.S. national stage of application No. PCT/FR02/03841, filed on Nov. 8, 2002.

The present invention relates to a portable device for supplying electric energy, in particular allowing an appliance such as a mobile telephone to be supplied.

Today numerous mobile and self-contained electric appliances exist. They are self-contained thanks to a rechargeable electric battery which they incorporate and which is sometimes removable in order that it can be replaced by another when it is discharged. As examples, mobile telephones, portable computers, electronic organizers or agendas can be mentioned. A major drawback results from the fact that the autonomy of these appliances is limited by the energy storage capacity of their battery, which requires them to be recharged regularly from the mains supply using a charger. The problem becomes critical when the user does not have access to the mains. Similarly, the user sometimes has access to the mains for only a short period, for example half-an-hour or less. It very often takes at least an hour to charge the batteries of these appliances, or even three hours, if not longer still. Therefore, the appliance's battery will be only very partially recharged.

In order to remedy this drawback, with some appliances a cord is proposed, allowing it to be connected to the cigar-lighter of a motor vehicle, which allows it to be powered from the battery of the vehicle. But the user does not always have his vehicle available, or else does not always have a long enough time to recharge the battery of his appliance.

The invention aims to at least partially remedy the drawbacks of the prior art.

Thus, a first aim of the invention is to facilitate the supply or recharging of an electric appliance in the presence of different sources of electric energy.

Another aim of the invention is to prolong the autonomy of electric appliances incorporating a rechargeable supply battery.

Yet another aim of the invention is to confer satisfactory autonomy on such appliances despite limited periods of availability of the mains or other supply.

In order to achieve this first aim, the invention proposes a portable device for the supply of electric energy, comprising:
- a connection means allowing connection of an appliance to be supplied; and
- a supply circuit delivering an output supply voltage for the appliance when the circuit is connected as wished to a mains supply or to a source of low-voltage electric energy.

Within the framework of the invention, by low voltage is meant a voltage below or equal to preferably 60 Volts, more advantageously 40 Volts, or even 28 Volts.

The device is preferably provided in order to accept any low input voltage within a range of for example 3 to 60 Volts. As a variant, it can be provided for one or more predefined low voltages such as 6 Volts, 12 Volts and 24 Volts. The invention is quite particularly suitable for supplying an appliance having a low-voltage energy supply input, for example 6 Volts, 9 Volts or 12 Volts. It will be understood that, within the framework of the invention, the input supply of the appliance can serve, according to the appliance:
- to directly supply the appliance in order to operate it—i.e. without using its supply battery as a buffer—but not to recharge its supply battery; or
- to recharge its supply battery, but not to directly supply the appliance in order to operate it;
- to simultaneously directly supply the appliance in order to operate it and recharge its supply battery.

In the case where the device is used solely for recharging the supply battery of an appliance, the battery can be charged by the device whether the battery is in the appliance or the battery has been previously removed from the appliance for the charging operation.

According to a preferred embodiment, the circuit includes a voltage converter delivering a given output voltage serving to supply the appliance, when the circuit is connected to a source of low-voltage electric energy. But if the circuit is connected to a source of low-voltage electric energy having a voltage within a predetermined range of voltages including the output voltage delivered by the converter, then the circuit supplies the appliance connected to the connection means from the source of electric energy without passing through the converter.

According to another preferred embodiment, the device includes a rechargeable electric energy storage means in which:
- the circuit charges the energy storage means when the circuit is connected to an appropriate source of electric energy; and
- the connection means allows the appliance to be supplied from the electric energy-storage means.

Thus, the device allows the appliance to be supplied thanks to the at least partially charged storage means, even if the charging circuit is no longer connected to the source of electric energy serving to charge it. The capacity of the storage means is chosen in order to be able to supply the appliance preferably for at least half-an-hour, but more advantageously for an hour, or even two hours. When the device is used for recharging the battery of an appliance, it is advantageous that the capacity of the storage means is at least equal to the storage capacity of the battery of the appliance, or at the very least at least half thereof.

In advantageous manner, the circuit can charge the energy storage means ultra-rapidly when the circuit is connected to an appropriate source of electric energy. Within the framework of the invention, the ultra-rapid charging of the storage means corresponds to the electric charging of the storage means to at least 50% of its storage capacity carried out in less than half-an-hour, preferably in less than a quarter-of-an-hour, and more advantageously in less than 8 minutes. The device thus allows rapid rechargings of its storage means even when the source of electric energy is available for only a few minutes, such as for example, a businessman spending a few minutes in his hotel room between two outside meetings. The device thus allows the appliance to be supplied in the absence of any other supply. Given that it is of portable type, the user can take the device with him, in order to power his appliance anywhere. This embodiment is all the more advantageous when the battery supplying the appliance and/or the appliance itself are not designed to allow an ultra-rapid charging of this battery. In fact the storage means creates a substantial autonomy vis-à-vis the battery supplying the appliance, when the charging time is limited by circumstances. Very generally, the appliances incorporating a supply battery—such as telephones or portable computers—do not allow ultra-rapid recharging of the latter. In fact, neither the circuits of the appliance, nor the battery itself tolerate the high currents—generally several amperes—necessary for such ultra-rapid charging. These appliances generally require at least an hour, and very often at least three hours, if not more, to recharge their battery.

The electric energy storage means can comprise a rechargeable battery. In this case, the capacity of the rechargeable battery is less than or equal to preferably three times, more advantageously twice, or even one-and-a-half times the storage capacity of the battery of the appliance, which allows a compactness and a limited weight of the device thus improving its portability.

According to an advantageous embodiment, the electric energy storage means comprises a rechargeable battery and the latter comprises several accumulator cells connected in series when the battery supplies the appliance connected to the connection means, each cell of the battery being charged ultra-rapidly via a respective charge-control circuit.

According to another preferred embodiment, the circuit includes a voltage converter supplying a given output voltage serving—optionally ultra-rapidly—to charge the energy storage means, when the circuit is connected to a source of low-voltage electric energy, and the energy storage means supplies the appliance connected to the connection means via the converter operating as a voltage booster when the voltage at the terminals of the energy storage means is below a predetermined threshold.

Moreover, it can be provided that when the circuit is connected to a source of low-voltage electric energy having a voltage within a predetermined range of voltages including the output voltage delivered by the converter, the circuit supplies the appliance connected to the connection means, and/or charges the energy storage means, from the electric energy source without passing through the converter.

According to another preferred embodiment, the circuit includes a voltage converter delivering a given output voltage serving to charge the energy storage means and/or to supply the appliance connected to the connection means when the circuit is connected to a source of low-voltage electric energy. But when the circuit is connected to a source of low-voltage electric energy having a voltage within a predetermined range of voltages including the output voltage delivered by the converter, then the circuit supplies the appliance connected to the connection means, and/or charges the energy storage means, from the source of electric energy without passing through the converter.

According to another preferred embodiment, when the circuit is connected to a source of electric energy having a voltage below a predetermined threshold, the circuit supplies the appliance connected to the connection means, but does not charge the energy storage means.

Moreover, the device can advantageously include a circuit limiting the current supplied to the appliance.

The device can moreover include a solar panel allowing the appliance to be supplied and/or charging of the energy storage means.

According to another preferred embodiment, the device includes connection means for connecting a removable and portable electric energy storage means in which, when said removable electric energy storage means is connected to said connection means, the supply circuit ultra-rapidly charges the removable electric energy storage means when the supply circuit is connected to an appropriate source of electric energy. In this case, the device may or may not include another non-removable storage means as described previously. The removable energy storage means can comprise a rechargeable battery. The thus-charged removable energy storage means can be disconnected from the device and then allows an appliance to be supplied—for example in order to recharge the battery of the appliance if it has one—in the absence of any other source of energy. Given that it is of portable type, the user can take the removable storage means with him to power his appliance anywhere. The preferential details given above concerning the choice of the capacity of the energy storage means of the device apply equally to the removable storage means.

The invention also proposes the use of the device of the invention to supply an electric appliance. The appliance is preferably of portable type, advantageously a mobile telephone or a portable computer or a pocket electronic agenda. An advantageous use resides in the fact that the device of the invention recharges a supply battery (2) of the electric appliance.

Moreover, it will be understood that the charging of an energy storage means of the invention can be implemented independently of the fact that the device of the invention can be connected at the input, as wished, to a mains supply and to a source of low-voltage electric energy. Thus the invention also proposes a method for supplying electric energy to an appliance comprising a supply battery and a supply input. The method comprises the stages of:

a) ultra-rapid charging of a rechargeable electric energy storage means of portable type; and b) connection of the energy storage means to the supply input of the apparatus.

The storage means preferably comprises a rechargeable battery. As already indicated, within the framework of the invention, the ultra-rapid charging of the storage means corresponds to the electric charging of the storage means to at least 50% of its storage capacity carried out in less than half-an-hour, preferably in less than quarter-of-an-hour, and more advantageously in less than 8 minutes.

The ultra-rapid charging of the storage means is generally carried out by means of a source of electric energy. The method according to the invention allows the appliance to be supplied by means of the at least partially charged storage means, even if the latter is no longer connected to the source of electric energy serving to charge it. The capacity of the storage means is chosen in order to be able to supply the appliance preferably for at least half-an-hour, but more advantageously for at least an hour, or even two hours.

The invention allows recharging of the storage means in situations where the source of electric energy is available for a short time, for example a businessman spending a few minutes in his hotel room between two outside meetings. The thus-charged storage means then allows his appliance to be supplied in the absence of any other source of energy. Given that it is of portable type, the user can take the device with him, in order to supply his appliance anywhere. The invention is quite particularly suitable for supplying an appliance having a low-voltage energy input supply, for example 6 Volts, 9 Volts or 12 Volts.

The invention is all the more advantageous when the battery supplying the appliance and/or the appliance itself are not designed to allow ultra-rapid charging of this battery. In fact the storage means creates a substantial autonomy vis-à-vis the battery supplying the appliance, when the charging time is limited by circumstances. Very generally, appliances incorporating a supply battery—such as telephones or portable computers—do not allow ultra-rapid recharging of the latter. In fact, neither the circuits of the appliance, nor the battery itself tolerate the high currents—generally several amperes—necessary for such ultra-rapid charging. These appliances generally require at least an hour, and very often at least three hours, if not more, to recharge their batteries.

It will be understood that, within the framework of the invention, the supply input of the appliance can serve, according to the appliance:

to directly supply the appliance in order to operate it—i.e. without using its supply battery as a buffer—, but not to recharge its supply battery; or to recharge its supply battery, but not to directly supply the appliance in order to operate it; or to simultaneously directly supply the appliance in order to operate it and recharge its supply battery.

Thus, according to a preferred embodiment of the invention, in stage b), the energy storage means can serve to recharge the battery supplying the appliance. In this case it is advantageous if the capacity of the storage means is at least equal to the storage capacity of the battery of the appliance, or at the very least half of the latter. The storage means then allows an appreciable recharging of the battery of the appliance. In this case, the capacity of the storage means, especially if it comprises a rechargeable battery, is below or equal preferably to three times, more advantageously twice, or even one-and-a-half times the storage capacity of the battery of the appliance, which allows a compactness and a limited weight thus improving its portability.

This embodiment of the invention is again particularly advantageous when the battery supplying the appliance and/or the appliance itself are not designed to allow ultra-rapid charging of its battery. This embodiment allows charging of the storage means even if the source of electric energy—for example the mains or a cigar-lighter of a vehicle—is available only for a few minutes. Due to the fact that it is of portable type, the user can take the storage means with him in order to recharge, by means of the latter, the battery of his appliance even when he no longer has access to the source of electric energy.

According to another embodiment of the invention, in stage b), the energy storage means is connected to the supply input of the appliance via a circuit limiting the current delivered to the appliance. This limiting circuit in particular protects the appliance against excess currents which could damage it.

According to another embodiment of the invention, in stage a), the charging of the energy storage means is carried out using a charger provided to be connected, as wished, to a mains supply or to a source of low-voltage electric energy. As already indicated, within the framework of the invention, by low voltage is meant a voltage below or equal to 60 Volts.

According to yet another embodiment of the invention, in stage a), the charging of the energy storage means is carried out using a charger also provided to supply the appliance. It is thus possible to simultaneously charge the storage means and to supply the appliance, and charge the battery of the latter if appropriate.

Moreover, the appliance to be supplied is preferably of portable type. It can advantageously be a mobile telephone or a portable computer or a pocket electronic agenda.

According to another feature, the invention also proposes a portable device for the supply of electric energy, comprising:

a rechargeable electric energy storage means;

a charging circuit, preferably charging the energy storage means ultra-rapidly when it is connected to an appropriate source of electric energy; and a connection means allowing connection of an appliance to supply the latter from the energy storage means.

The device according to the invention allows the appliance to be supplied by means of the at least partially charged storage means, even if the charging circuit is no longer connected to the source of electric energy serving to charge it. The capacity of the storage means is chosen so as to be able to supply the appliance preferably for at least half-an-hour, but more advantageously for at least an hour, or even two hours.

If the charging of the storage means is of the ultra-rapid type, this device allows rapid rechargings of its storage means even when the source of electric energy is available for only a few minutes, the device consequently allowing the appliance to be supplied in the absence of any other source of energy.

According to an embodiment of the invention, the electric energy storage means comprises a rechargeable battery.

Moreover, the battery can comprise several accumulator cells connected in series when the battery supplies the appliance connected to the connection means, and each cell can advantageously be charged ultra-rapidly via a respective charge-control circuit.

According to another embodiment of the invention, the charging circuit supplies the appliance connected to the connection means, when the charging circuit is connected to the source of electric energy.

According to another embodiment of the invention, the charging circuit is suitable for being connected as wished to a mains supply or to a low-voltage supply.

According to yet another embodiment of the invention, the charging circuit includes a voltage converter delivering a given output voltage serving to charge the energy storage means ultra-rapidly, when the device is connected to a source of low-voltage electric energy, and the energy storage means supplies the appliance connected to the connection means via the converter operating as a voltage booster when the voltage at the terminals of the energy storage means is below a predetermined threshold.

It is also advantageous that, when the charging circuit is connected to a source of low-voltage electric energy having a voltage within a predetermined range of voltages including the output voltage delivered by the converter, the charging circuit supplies the appliance connected to the connection means, and/or charges the energy storage means, from the source of electric energy without passing through the converter.

According to yet another embodiment of the invention, when the charging circuit is connected to a source of electric energy having a voltage below a predetermined threshold, the charging circuit supplies the appliance connected to the connection means, but does not charge the energy storage means.

Generally, the invention has the advantage of not requiring modifications to the electric appliances to be supplied, in particular to the physical connection interface serving as supply input of the appliances. Therefore, the invention can be realized for any existing electric appliance.

Other characteristics and advantages of the invention will become apparent on reading the description which follows of preferred embodiments of the invention, given by way of example and with reference to the attached drawing.

Figure 1:
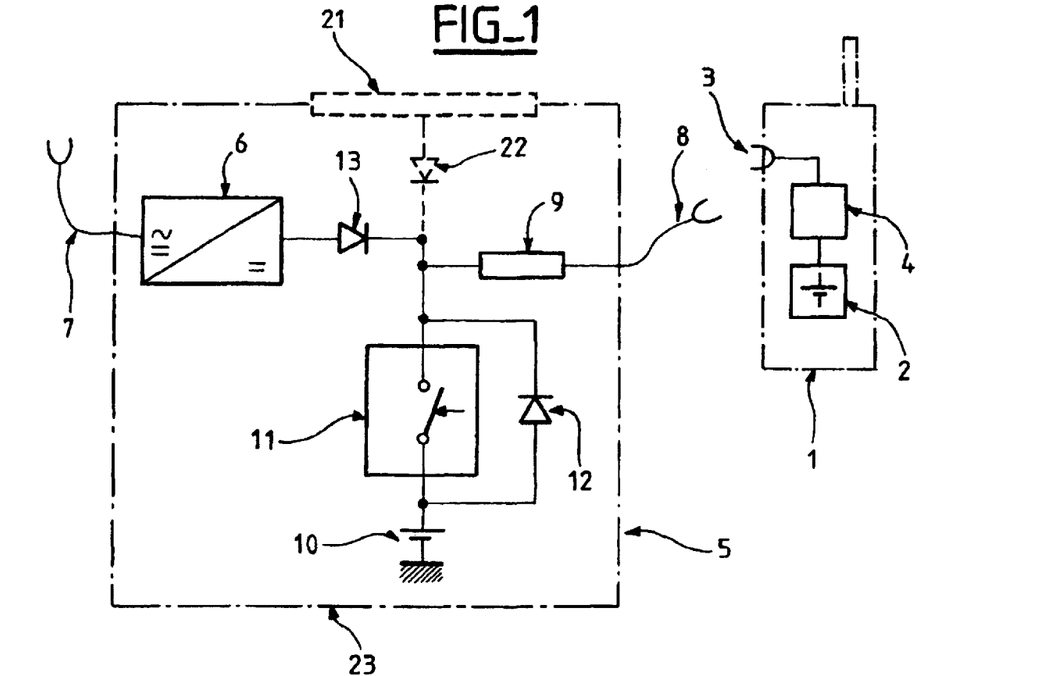
FIG. 1 represents the schematic diagram of a supply system according to the invention, provided for recharging the battery of a mobile telephone.

In an effort to simplify matters, the supply system of the embodiment of FIG. 1 is not provided to be connected to a low-voltage source, but only to a mains supply. Thus, the description first makes it possible to understand the other features of the invention before describing with reference to FIG. 1 the embodiments of the other figures which comprise a possibility of connection to a low-voltage source.

The supply system 5 illustrated in FIG. 1 is provided in order to be used with a mobile telephone 1. The mobile telephone 1 can be of any known type. In standard manner, the latter is supplied by a rechargeable battery 2 which is housed in its casing.

The casing of the telephone 1 is generally equipped with a connector 3 serving to recharge the battery 2 via a control circuit 4. The control circuit 4 serves in particular to verify the level of charge of the battery 2 in order to inform the user of it and whether or not it is necessary to recharge the battery 2 and/or to protect the battery 2 against misuse.

The recharging of the battery 2 is carried out by applying to the connector 3 a d.c. voltage of approximately 5 Volts which is delivered in this case by the supply system 5 according to the invention.

For this purpose, the supply system 5 includes a converter circuit 6 which supplies a d.c. output voltage of 6 Volts from the mains applied to its input. The converter 6 can be of any appropriate standard type. In particular, it can be a standard supply circuit based on a transformer, a Graetz bridge and a filter capacitor. However, it is preferable to use a switching-mode power supply which has the advantage of being more compact and light.

The converter 6 is preferably provided for accepting the alternative input voltages of the mains supplies in different countries, in particular 110 Volts 60 Hz and 220 to 240 Volts, 50 Hz.

More advantageously, the converter 6 can be realized in the form of a switching-mode power supply adapting automatically at its input to the whole of a range of a.c. or d.c. voltages covering the different mains supply voltages existing in the world. Thus, the converter 6 can be provided in order to receive any input voltage within a range of 80 to 240 Volts a.c.—50 or 60 Hz—or within a range of 100 to 350 Volts d.c. The input of the converter 6 can be connected in standard manner to the mains via a cord 7 equipped at its end with a male connector.

The supply system 5 includes a rechargeable battery 10. The output of the converter 6 is connected to the battery 10 in order to recharge it when the supply system 5 is connected to the mains.

The converter 6 is preferably provided to realize an ultra-rapid charging of the battery 10. The battery 10 is consequently chosen in order to tolerate such ultra-rapid charging and the converter 6 is designed to deliver a current sufficient to allow this charging. Such batteries, in particular of the nickel-cadmium type in sealed-cylinder form, are for example marketed by the French company Saft. A circuit 11 controls the charging current applied to the battery 10. In FIG. 1, the control circuit 11 has been symbolically represented in the form of a controlled switch. In practice, this control circuit 11 can be realized in known manner, in particular by following the instructions of the battery manufacturer. It can in particular be based on an MOS transistor used in switching. Generally, the ultra-rapid charging consists of applying a constant high current until the voltage at the terminals of the battery—or at each of its cells—reaches a predefined threshold, which generally allows recharging of the battery to approximately 75% of its capacity, or even more. The charging can then be continued more slowly, at lower currents. Generally, it is also desirable to carry out a control of the battery charging current according to the temperature of the battery. This role can also be carried out by the circuit 11.

Moreover, the battery 10 is connected to a cord 8 equipped at its end with a connector allowing connection of the supply system 5 to the connector 3 of the mobile telephone 1. In order to establish this connection, the charging control circuit 11 can be bridged by a diode 12. The diode 12 is preferably a Schottky diode because of the slight drop in voltage present at its terminals when it is conducting. The battery 10 thus allows recharging of the battery of the telephone 1 and/or direct supply of the telephone 1. Of course, if the control circuit 11 is based on a bidirectional switch, the role of the diode 12 can also be assumed by the switch of the control circuit 11 in which case the diode 12 is superfluous.

The supply system 5 preferably includes a circuit 9 limiting the current delivered by the battery 10 to the telephone 1. The current-limiting circuit 9 serves to protect the mobile telephone 1 against the excess currents which could damage it—quite particularly during the charging of the battery 2 by the supply system 5—as the control circuit 4 of the telephone 1 generally fulfils this function inadequately or not at all. In a simple version, the current-limiting circuit 9 can consist of a simple resistor. But it can also be a controlled switch—such as an MOS transistor—chopping the current according to the evolution of the charging current delivered to the battery 2.

The choice of the battery 10 as regards its storage capacity is made in consideration of the power consumption of the appliance to be powered, in this case, in consideration of the capacity of the battery of the telephone 1. Generally, a storage capacity of the battery 10 is chosen that is sufficient to recharge the battery 2 completely or at least 90%. Thus, the storage capacity is preferably chosen to be at least equal to that of the battery 2. Evidently, it can also be clearly greater than that of the battery of the appliance to be recharged in order to allow the latter to be charged several times. Inasmuch as the supply system 5 is of portable type, the choice is also made in consideration of the weight and size of the battery 10, as well as of the converter 6 which must deliver a charging current which is all the greater in the case of ultra-rapid charging of the battery 10.

The choice of the battery 10 as regards its voltage is made in consideration of the supply voltage required by the appliance to be supplied. For a mobile telephone the battery 2 of which is for example of the 3.6 V, lithium-ion type, the voltage at the terminals of the latter varies between approximately 2.5 and 4.2 Volts, according to its charge level. Consequently, the voltage of the battery 10 is preferably chosen to be sufficient to charge the battery 2 up to 4.2 Volts, taking into account drops in voltage introduced by the intermediate elements between the battery 10 and the battery 2, i.e. in particular the diode 12, the current-limiting circuit 9 and the control circuit 4. By way of example, a 6-Volt nickel-cadmium battery can be used—i.e. five cells of 0.9 Volts each—the voltage of which varies from approximately 4.5 Volts to 7.5 Volts according to its charge level.

Of course, the converter 6 is preferably chosen to deliver a voltage sufficient to fully charge the battery 10. Thus, in our example, the voltage delivered by the converter 6 can be of the order of 8 or 9 Volts.

In the case where the voltage of the battery 10 is too great by comparison with that which the appliance to be supplied can accept, the supply system 5 can include a circuit limiting the output voltage applied to the cord 8, this circuit being based for example on a Zener diode.

On the other hand, in the case where the battery 10 is chosen with a voltage too low compared with that required by the external appliance, the supply system 5 can be supplemented by a voltage-boosting circuit in order to increase the voltage delivered by the battery 10 to a sufficient level.

Moreover, the output of the converter 6 is connected to the cord 8, if appropriate via the current-limiting circuit 9 and/or the above-mentioned voltage-limiting circuit. Thus, the converter 6 directly supplies the external appliance when it is connected to the mains. In this way, the converter 6 charges the battery 10 at the same time that it supplies the external appliance. However, this connection between the output of the converter 6 and the cord 8 can be omitted. In this case, the supply cannot directly supply the appliance 1.

A diode 13 is preferably provided at the output of the converter 6 to prevent the possible discharging of the battery 10 and/or the battery 2 of the external appliance through the converter 6.

The supply system 5 advantageously allows charging of its battery 10 in a few minutes when the user has access to the mains. Optionally, it simultaneously allows commencement of the charging of the battery 2 of the telephone 1 from the mains. When the mains supply is not available, the supply system 5 commences or continues the charging of the battery 2 from the energy stored in its battery 10.

Figure 2:
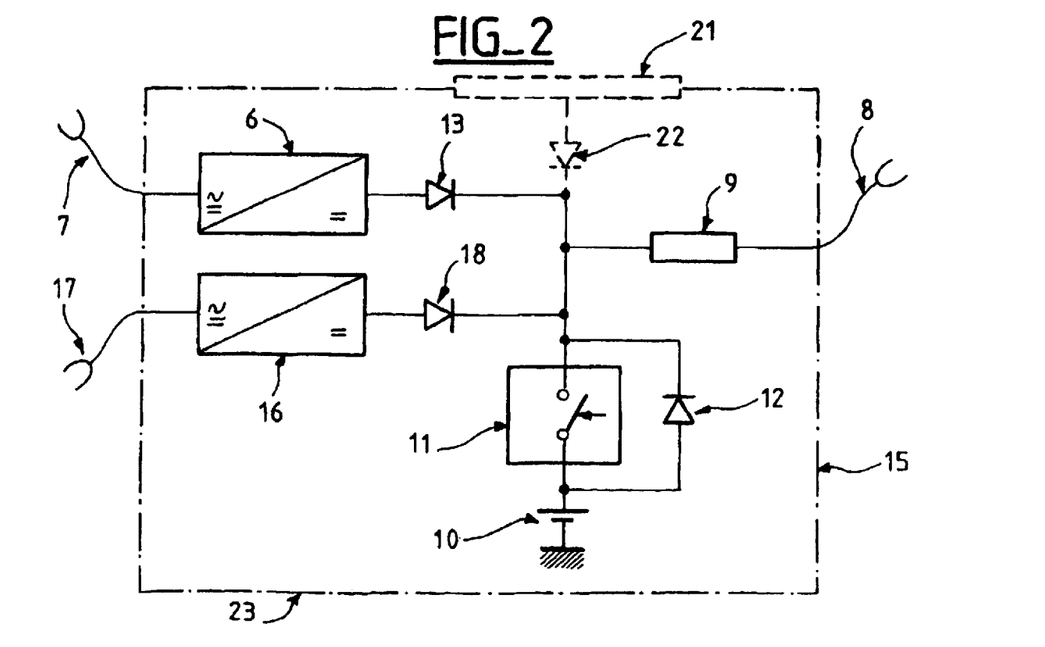
FIG. 2 represents a variant of the supply system of FIG. 1.

The supply system 15 of FIG. 2 is a more developed version of the supply system 5 of FIG. 1. It identically comprises, and with the same operation, all the elements of the supply system 5 which consequently have the same reference numbers in FIG. 2. In our example, the supply system 15 is also intended to be used with the telephone 1, not represented in FIG. 2. It also includes supplementary circuits.

Thus the supply system 15 includes a second converter 16 delivering the same output voltage as the first converter 6, but from a low applied input voltage. It is preferably a converter accepting in input a voltage within a range of 3 to 15 Volts, or even from 3 to 25 Volts, d.c. or a.c. This converter can be of any appropriate known type. It can in particular be a so-called "buck-boost" structure which lowers or raises the input voltage in order to deliver a predetermined output voltage. The output of the converter 16 supplies the battery 10 and preferably also the external appliance, in a similar manner to the converter 6. Thus, the output of the converter 16 can charge the battery 10 via the charging control circuit 11 and supply the external appliance connected to the cord 8 via, if appropriate, the current-limiting circuit 9 and the voltage-limiting circuit already mentioned for the supply system 5. The input of the converter is connected to a cord 17 equipped with one or more connectors allowing connection with different types of low-voltage electric sources. By way of example, it can be a 9-Volt electric battery, a 6-Volt bicycle dynamo or the 12-Volt battery of a motor vehicle on which it is possible be connected to the cigar-lighter. Thus, the source of electric energy allows charging of the battery 10 and/or direct supply to the external appliance, in a similar manner to the converter 6 from the mains.

A diode 18 is preferably provided at the output of the converter 16 to prevent the batteries 2 or 10 from being able to discharge via the converter 16 or the converter 6 from being able to inject a current into the latter. In a similar manner, the diode 13 prevents the converter 16 from being able to inject a current into the output of the converter 6.

Figure 3:
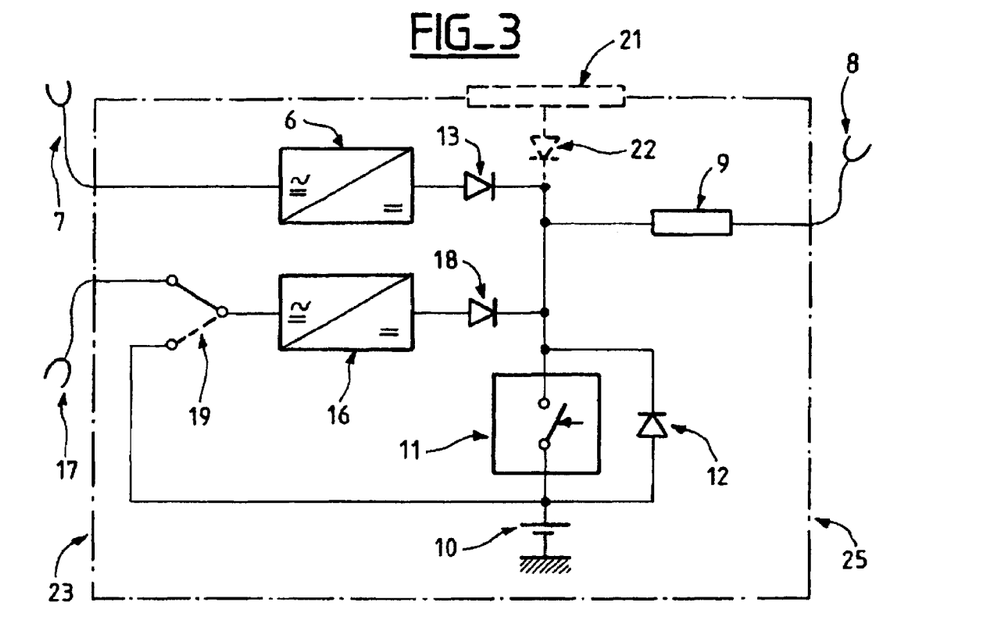
FIG. 3 represents a variant of the supply system of FIG. 2.

The supply system 25 in FIG. 3 is a variant of the supply system 15 in FIG. 2. It comprises, identically, and with the same operation, all the elements of the supply system 15 which consequently have the same reference numbers in FIG. 3. In our example, the supply system 25 is also intended to be used with the telephone 1 not represented in FIG. 3.

The supply system 25 differs from the supply system 15 in that it also includes a controlled changeover switch 19 which can be realized using transistors for example. This changeover switch 19 allows connection of the input of the converter 16 selectively to the low-voltage supply source connected to the cord 17 or the battery 10. A circuit—not represented—controls the changeover switch 17 in order to connect the cord 17 to the input of the converter 16 when the low-voltage supply source is effectively connected to the cord 17. To this end, the presence of the low-voltage supply source can be determined by detection of its voltage at the terminals of the cord 17, for example by means of a comparator circuit with an operational amplifier. In this case, the supply is found in the configuration of the supply system 15. On the other hand, when the supply system 25 is in the process of supplying the external appliance connected to the cord 8 while none of the supply sources—neither the mains, nor the low-voltage source—is connected to the cords 7 and 17, the control circuit of the changeover switch 19 can cause the switching of the changeover switch 17 in order to connect the battery 10 to the input of the converter 16. In other words, the battery 10 then supplies the external appliance via the converter 16. This possibility is advantageous given that the voltage at the terminals of the battery 10 drops steadily as a function of its discharge. Thus, it allows the voltage of the battery 10 to be boosted to a level sufficient to continue supplying the external appliance in the case where the voltage at the terminals of the battery 10 becomes too low. This possibility thus allows fuller advantage to be taken of the storage capacity of the battery 10. The latter will also be able to be constituted by a smaller number of accumulator cells in order to define a battery having a lower voltage. This results in a saving in weight and size. By way of example, for the telephone 1 having a 3.6 Volt lithium-ion type battery, the battery 10 can be constituted by four nickel-cadmium cells of 1.2 Volts instead of five, in the example mentioned for the supply system 5. This results in a 4.8-Volt battery, the voltage of which varies between 3.6 Volts and 6 Volts depending on its charge level. When it drops below 5 Volts, the voltage of the battery 10 becomes insufficient to charge the battery 2 to a voltage of 4.2 Volts taking into account drops in voltage introduced by the intermediate elements: diode 12, current-limiting circuit 9, control circuit 4, etc. Hence, the control circuit of the changeover switch 19 can be provided to connect the battery 10 to the input of the converter 16 once the voltage of the battery 10 drops below S Volts. From then on, it is the—higher—output voltage of the converter 16 which supplies the battery 2. Moreover, the output voltage delivered by the converters 6 and 16 can be of the order of 6 or 7 Volts, instead of the 8 or 9 Volts already mentioned in the case of the supply system 5.

Figure 4:
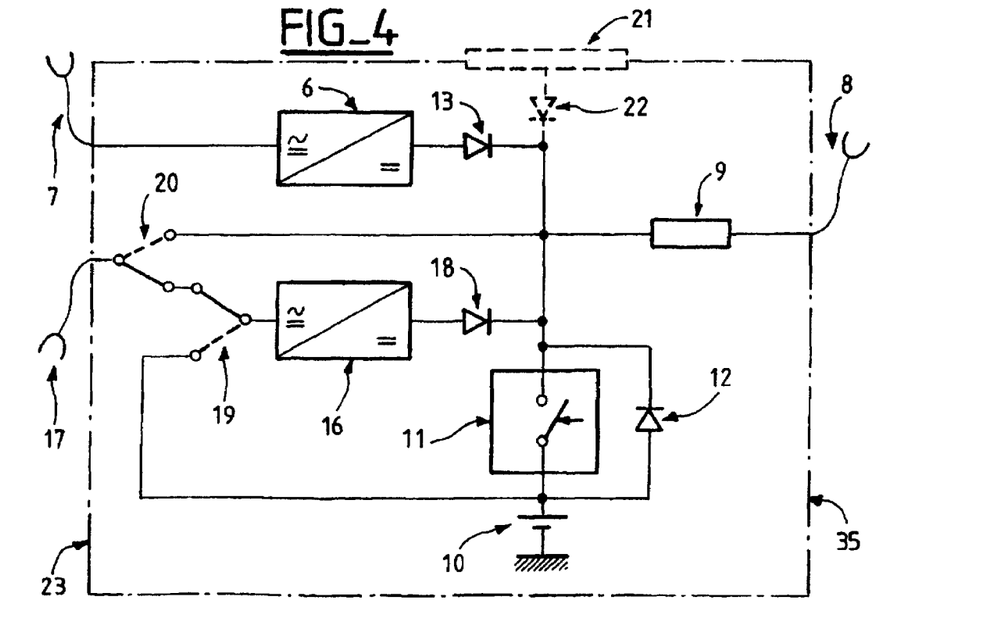
FIG. 4 represents a variant of the supply system of FIG. 3.

The supply system 35 in FIG. 4 is a variant of the supply system 25 of FIG. 3. It comprises identically, and with the same operation, all the elements of the supply system 25 which consequently have the same references in FIG. 3. In our example, the supply system 25 is also intended to be used with the telephone 1 not represented in FIG. 4.

The supply system 35 differs from the supply system 25 in that it also includes another controlled changeover switch 20 which can be realized by means of transistors for example. This changeover switch 20 allows connection of the low-voltage supply source connected to the cord 17 selectively to the input of the converter 16 via, if appropriate, the changeover switch 19 or the cord 8 via, if appropriate, the current-limiting circuit 9. In the first position of the changeover switch 20, the supply system 35 is found in the configurations previously described. In the other position, the low-voltage energy source supplies the external appliance via the current-limiting circuit 9 and the battery 10, without passing through the converter 16. A control circuit—not represented—puts the changeover switch 20 in this other position when the voltage of the supply source connected to the cord 17 is situated within an acceptable range to be applied directly to the external appliance and to the battery 10. Losses in output linked to the converter 16 will thus be avoided. By way of example, for the telephone 1 having a 3.6 V lithium-ion-type battery, this voltage range can be 5.5 to 7 Volts.

It will be understood that this variant can also be realized in the absence of the changeover switch 19 allowing connection of the battery 10 to the input of the converter 16. In other words, this variant can be realized on the supply system 15 of FIG. 2. For this, it is sufficient to connect the terminal of the switch 20—which is connected in FIG. 4 to one of the terminals of the changeover switch 19—directly to the input of the converter 16.

In another variant which is applicable to any of the preceding supply systems having a low-voltage converter 16—i.e. the supply systems 15, 25 and 35—, the supply system is provided not in order to charge the battery 10, but solely to supply the external appliance, when the supply is connected not to the mains by the cord 7, but only to a low-voltage energy source below 12 Volts by the cord 17. On the other hand, when it is connected, as wished, to a low-voltage energy source above or equal to 12 Volts or to the mains, the supply system preferably carries out simultaneously the charging of the battery 10 and the supply of the external appliance connected to the cord 8 as described previously. However, when the external appliance is not connected to the cord 8, the supply system charges the battery 10 whatever the energy source available at the input. If the current is not sufficient to allow ultra-rapid charging, it can of course be carried out more slowly.

This variant advantageously allows discrimination between the energy sources applied at the input according to their suitability or not for supplying a sufficient current to simultaneously charge the battery 10 and to supply the external appliance. In fact, an energy source having a voltage above or equal to 12 Volts generally corresponds to a motor vehicle battery which is capable of delivering a current sufficient to simultaneously charge the battery 10 and to supply the external appliance. On the other hand, a power source having a voltage below 12 Volts generally corresponds to a low-energy source which should then be more advantageously used to supply just the external appliance when the latter is connected to the cord 8. This is the case in particular when the low-voltage source is a bicycle dynamo or else an R61 9-Volt, R12 4.5-Volt or similar standard-type cell. In the case of the cells, this variant is all the more justified by the fact that these cells themselves constitute an energy-storage element which is easily transportable by an individual: it is then more advantageous to directly supply the external appliance without intermediate storage in the battery 10 which necessarily involves losses in output as well as time.

An alternative to this variant consists of not automatically operating the selection between the supply of just the external appliance and the simultaneous charging of the battery 10, as a function of the voltage of the power source connected at the input. Instead of that, the supply system can include a manual switch allowing the user selectively to allow or prevent the charging of the battery 10 from the energy source connected at the input. Consequently, he can himself choose whether he wishes to supply just the external appliance connected to the supply, or simultaneously charge the battery 10.

Of course, the present invention is not limited to the examples and embodiments described and represented, but it is capable of numerous variants accessible to a person skilled in the art.

Thus, the power supply systems 5, 15, 25 and 35 can all include a casing 23 which houses all of the circuits which form part thereof, including the battery 10, with the connectors of the cords 7, 8 and if appropriate 17, which are accessible from the outside of the casing 23. The casing 23 has been symbolically represented by dash-dotted lines in the figures. As a variant, the battery 10 can be outside the casing 23 and removable. In this case, the supply system can include a connector—for example placed in a housing made in the casing 23 and accessible from outside the casing—to allow connection and disconnection of the battery 10. This variant has the advantage of being able to successively charge several batteries 10 and then to use them successively to supply the external appliance. In this case, provision can moreover be made to use a separate cord—including if appropriate a current-limiting circuit similar to that referenced 9—to connect the external appliance to the battery 10, without passing through the supply system in the casing 23. In other words, the supply system in the casing 23 serves to recharge the battery 10 which can then be separated from the casing 23 and connected to the separate cord to the external appliance to supply the latter. The cord 8 of the supply in the casing 23 can even be omitted in this case.

Moreover, the battery 10 can be replaced by any appropriate electric energy storage means, preferably allowing to be charged ultra-rapidly. These can in particular be supercapacitors. These can for example be supercapacitors having capacities of the order of 3000 Farad marketed by the Korean company Ness.

Of course, the invention can be put into practice with a battery 10 or another electric energy storage means not allowing ultra-rapid charging, in which case the supply of the invention can be provided without the ability to carry out this type of charging.

Another variant consists of providing a solar panel 21—for example of 7.2 Volts—on the casing 23 and which also allows charging of the battery 10 and/or supply of the external appliance. A diode 22 can then also be provided to prevent the battery 10, the battery 2 or another energy source connected to the supply input from being able to discharge into the solar panel. Such a solar panel can advantageously procure electric energy in the absence of any other available source.

Of course, the cords with connectors 7, 8 and 17 can be replaced by any other appropriate means allowing connection of the power sources at the input, as well as the external appliance.

Figure 5:
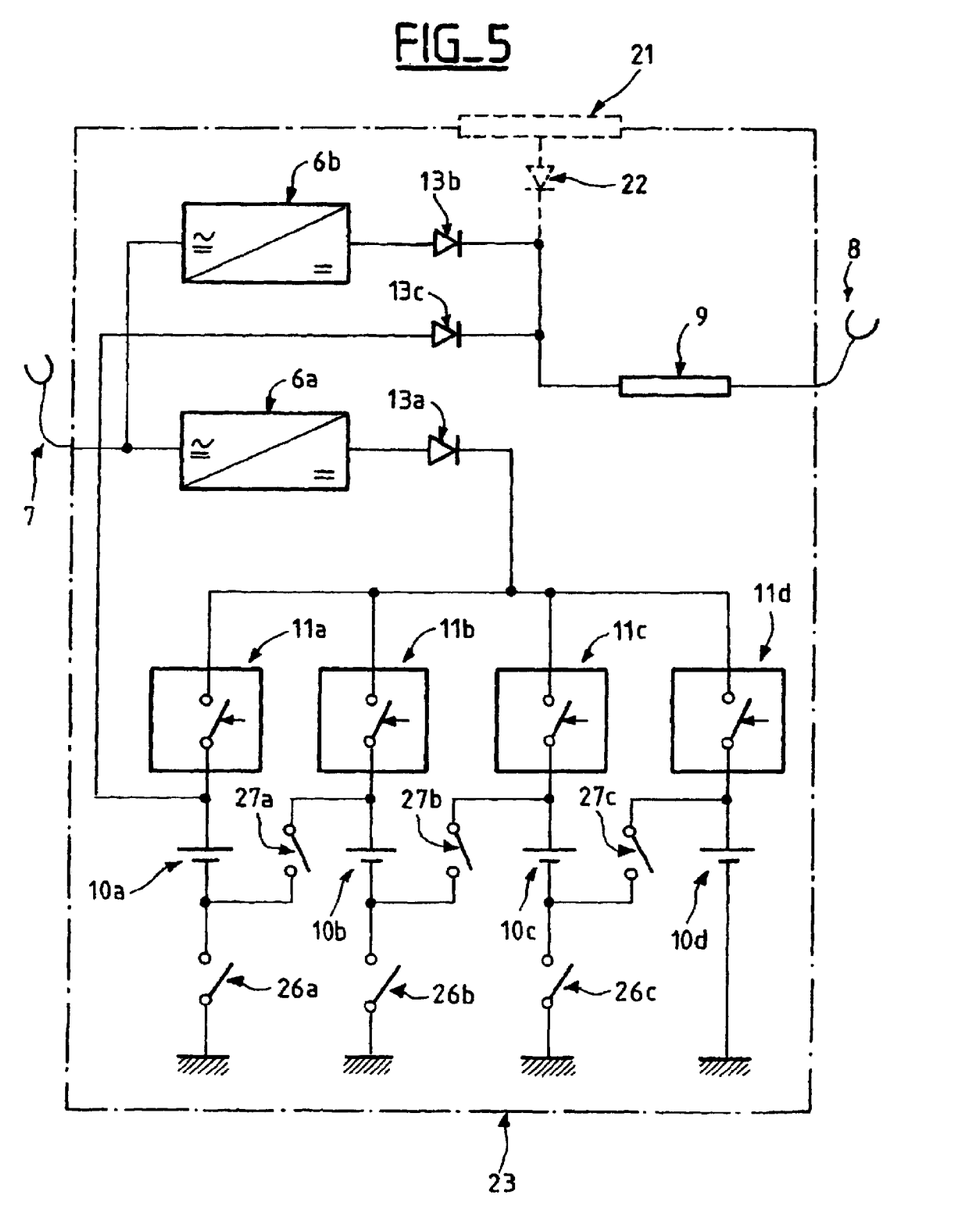
FIG. 5 represents a variant of the supply system of FIG. 2 which allows an individual control of the charging of each accumulator cell constituting the battery with which this supply system is equipped.

The battery 10 is generally constituted by several elementary accumulator cells connected in series in order to obtain the desired battery voltage—cf. the examples mentioned in relation to FIGS. 1 and 3. Consequently, the charging of the battery 10 is carried out in standard manner on the battery 10 with its cells connected in series. As a variant, the charging of the battery 10 can be carried out individually for each of the cells of the battery 10. Such a variant is represented by FIG. 5 and is based on the supply system 5 of FIG. 2. The references 8 and 9 respectively designate the current-limiting circuit and the cord serving to connect the external appliance to be supplied. The battery 10 taken as an example comprises four elementary cells 10*a* -10*d*. Each of the cells 10*a*-10*d* has a corresponding charging control circuit 11*a*-11*d*. The objective of each of these charge-control circuits 11*a*-11*d* is to carry out ultra-rapid charging of the cell which corresponds to it. The current is delivered by a converter 6*a* which replaces the converter 6 of the supply system 2. The converter 6*a* differs from the converter 6 in that it delivers a voltage adequate for charging a cell of the battery, and not the whole battery. A diode 13*a* is found at the output of the converter 6*a*, playing the same role as the diode 13 in the supply system 5. The charge-control circuits 11*a*-11*d* are similar to the control circuit 11 of the supply system 5, except that they are each provided for the control of a single battery cell instead of the whole battery. A series of controlled switches 27a-27c—for example MOS transistors—allow—when they are closed—connection of the cells in series in order to constitute the battery 10. Another series of controlled switches 26a-26c—for example MOS transistors—allow—when they are closed—connection of a terminal of each battery cell—except for the last, referenced 10d—to the earth, the other terminal of the cells being permanently connected to their respective charge-control circuit 11a-11d. The cell 10d is itself permanently connected to the earth. Moreover, the terminal of the first cell 10a which is connected to its charging control circuit 11a, is also connected to the cord 8 via the current-limiting circuit 9. This is preferably achieved via another diode 13c avoiding the injection of a current to the cell 10a by the battery 2 or the converter 13b which will be described hereafter. When the battery 10 is to be charged, a control circuit—not represented—opens the switches 27a-27c and closes the switches 26a-26c. In this manner, each of the cells 10a-10c is charged via its charging control circuit 11a-11c. On the other hand, when the external appliance connected to the cord 8 is to be supplied, the control circuit opens the switches 26a-26c and closes the switches 27a-27c. The voltage resulting from the arrangement in series of the cells 10a-10d is then applied to the appliance via the diode 13c and the current-limiting circuit 9. The supply system can be equipped with an additional converter 6b if it is desired to be able to simultaneously charge the cells 10a-10d and to supply the appliance connected to the cord 8 when the cord 7 is connected to the mains. The converter 6b also receives mains supply at the input by means of the cord 7. The converter 6b delivers an output voltage allowing the appliance to be supplied directly via the current-limiting circuit 9. Here too, a diode 13b provides the coupling to the current-limiting circuit 9. This last variant allows more reliable charging of the battery owing to the individual control of each battery cell. Of course, this variant can be adapted to any embodiment described previously, in particular to the supply systems 15, 25 and 35.

It will be understood that the device according to the invention allows any sort of electric appliance to be supplied, in particular appliances not possessing their own battery, unlike the mobile telephone taken as an example. Thus a radio set can for example be supplied.

According to yet another variant, the charge-control circuit 11 and the battery 10 are omitted in the supply systems 15 and 35. This then simply results in a universal supply allowing the supply of the external appliance as wished by the mains or by a low-voltage energy source, or even by the solar panel 21 integrated in the casing 23. But the supply no longer offers the possibility of its own electric energy storage.

Moreover, in order to ensure optimum portability of the supply device of the invention—whether or not it includes a energy storage means 10—, its weight is preferably below or equal to three times, more advantageously one-and-a-half times and still more advantageously once the weight of the appliance which it is intended to supply in the case where this appliance is a portable telephone or else a pocket electronic agenda. In similar fashion, its weight is preferably below or equal to 20%, more advantageously 10% of the weight of the appliance which it is intended to supply in the case where this appliance is a portable computer.

Finally, it will be noted that the embodiment in FIG. 1 illustrates the fact that the use of a buffer energy storage means 10 is independent of the possibility for the device of the invention to be able to be supplied from a mains supply or from a source of low-voltage electric energy.

The invention claimed is:

1. A portable device for supplying electric energy, comprising:
    a connection means for allowing connection to an appliance having at least one rechargeable supply battery;
    a supply circuit delivering an output supply voltage; and
    a rechargeable electric energy storage means, the supply circuit ultra-rapidly charging the energy storage means when the supply circuit is connected to an appropriate source of electric energy;
    wherein the connection means allows the appliance to be supplied and the at least one rechargeable supply battery to be charged from the energy storage means when the appliance is connected to the connection means;
    wherein when the supply circuit is connected to a source of electric energy having a voltage below a predetermined threshold, the supply circuit supplies the connection means from the source of electric energy, but does not charge the energy storage means; and
    wherein when the supply circuit is connected to the source of electric energy having the voltage above or equal to said predetermined threshold, the supply circuit supplies the connection means and charges the energy storage means from the source of electric energy.

2. The device according to claim 1, wherein the output supply voltage for the appliance delivered by the circuit is a low voltage.

3. The device according to claim 1, wherein the supply circuit is configured for connection either to a main supply or to a source of low-voltage electric energy.

4. The device according to claim 1, wherein the electric energy storage means comprises a rechargeable battery.

5. The device according to claim 1, wherein the electric energy storage means comprises a rechargeable battery, the rechargeable battery comprises several accumulator cells connected in series when the rechargeable battery supplies the connection means, and each cell of the rechargeable battery is charged ultra-rapidly via a respective charge-control circuit.

6. The device according to claim 1, wherein the supply circuit includes a converter delivering a given output voltage serving to supply the connection means and to charge the storage means, when the circuit is connected to a source of low-voltage electric energy.

7. The device according to claim 6, wherein the energy storage means supplies the connection means via the converter operating as a voltage booster when the voltage at terminals of the energy storage means is below a predetermined threshold.

8. The device according to claim 6, wherein, when the supply circuit is connected to a source of low-voltage electric energy having a voltage within a predetermined range of voltages including the output voltage delivered by the converter, the supply circuit supplies the connection means and charges the energy storage means, from the source of electric energy without passing through the converter.

9. The device according to claim 1, wherein said predetermined threshold is 12 Volts.

10. The device according to claim 1, further including a circuit limiting current delivered to the connection means.

11. The device according to claim 1, further including a solar panel allowing the connection means to be supplied and the energy storage means to be charged.

12. The device according to claim 1, intended to be used for charging a supply battery of an appliance that is not configured for allowing an ultra-rapid charging of said supply battery.

13. A method for supplying electric energy to an electric appliance, comprising:
supplying the electric appliance with electric energy produced by a device according to claim 1.

14. The method according to claim 13, wherein the device is portable.

15. The method according to claim 13, wherein the appliance comprises a portable telephone, a portable computer, or a pocket electronic agenda.

16. The method according to claim 13, the method further comprising recharging a supply battery disposed in the electric appliance.

* * * * *